US011342664B2

(12) United States Patent
Liu

(10) Patent No.: US 11,342,664 B2
(45) Date of Patent: May 24, 2022

(54) METHOD FOR ANTENNA SELECTION AND RELATED PRODUCTS

(71) Applicant: GUANGDONG OPPO MOBILE TELECOMMUNICATIONS CORP., LTD., Guangdong (CN)

(72) Inventor: Chang Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 52 days.

(21) Appl. No.: 17/107,924

(22) Filed: Nov. 30, 2020

(65) Prior Publication Data

US 2021/0226333 A1    Jul. 22, 2021

(30) Foreign Application Priority Data

Jan. 21, 2020 (CN) .......................... 202010072643.2

(51) Int. Cl.
*H01Q 3/24* (2006.01)
*H01Q 3/26* (2006.01)
*H01Q 21/29* (2006.01)

(52) U.S. Cl.
CPC ............. *H01Q 3/24* (2013.01); *H01Q 3/2617* (2013.01); *H01Q 21/293* (2013.01)

(58) Field of Classification Search
CPC ........ H01Q 3/24; H01Q 3/2617; H01Q 21/24; H01Q 21/29; H01Q 21/293; H01Q 21/296; H04B 7/0691; H04B 7/082; H04B 7/0874
See application file for complete search history.

(56) References Cited

U.S. PATENT DOCUMENTS 9,952,307 B2    4/2018 Gan
2003/0232595 A1  12/2003 Baker et al.
(Continued)

FOREIGN PATENT DOCUMENTS

CN    102122976    7/2011
CN    102565793    7/2012
(Continued)

OTHER PUBLICATIONS

SIPO, First Office Action for CN Application No. 202010070757.3, dated Feb. 7, 2021.
(Continued)

*Primary Examiner* — Jason Crawford
(74) *Attorney, Agent, or Firm* — Hodgson Russ LLP

(57) ABSTRACT

A method for antenna selection and related products are provided. The method is applicable to a user terminal equipment including four internal-antenna groups and one external-antenna group. The four internal-antenna groups are distributed around a periphery of the user terminal equipment. Each internal-antenna group includes two internal antennas with different polarization directions. The external-antenna group is electrically coupled to the user terminal equipment. The method includes the following. Whether the user terminal equipment is coupled to the external-antenna group is determined. When the user terminal equipment is coupled to the external-antenna group and the external-antenna group is determined to be enabled, two target internal antennas are determined from any of the four internal-antenna groups or two adjacent internal-antenna groups among the four internal-antenna groups. A target antenna group is formed according to the two target internal antennas and two external antennas to receive and transmit radio frequency signals.

20 Claims, 10 Drawing Sheets

(56) References Cited

U.S. PATENT DOCUMENTS

| | | | | |
|---|---|---|---|---|
| 2010/0177655 | A1* | 7/2010 | Duenyas | H04W 4/20 |
| | | | | 370/252 |
| 2011/0105049 | A1 | 5/2011 | Yamada et al. | |
| 2011/0300850 | A1 | 12/2011 | Kuo et al. | |
| 2013/0237294 | A1 | 9/2013 | Periyalwar et al. | |
| 2013/0315076 | A1* | 11/2013 | Zhao | H04B 7/082 |
| | | | | 370/252 |
| 2015/0256213 | A1 | 9/2015 | Jan et al. | |
| 2016/0381570 | A1 | 12/2016 | Lysejko et al. | |
| 2019/0386399 | A1 | 12/2019 | You et al. | |
| 2020/0204240 | A1* | 6/2020 | Ryu | H04B 7/0404 |
| 2021/0226315 | A1* | 7/2021 | Liu | H01Q 1/125 |
| 2021/0226330 | A1* | 7/2021 | Zhou | H01Q 21/28 |
| 2021/0226333 | A1* | 7/2021 | Liu | H04B 7/0691 |
| 2021/0227400 | A1* | 7/2021 | Jia | H04B 17/21 |

FOREIGN PATENT DOCUMENTS

| | | |
|---|---|---|
| CN | 102594376 | 7/2012 |
| CN | 102883006 | 1/2013 |
| CN | 103079268 | 5/2013 |
| CN | 203433115 | 2/2014 |
| CN | 103887613 | 6/2014 |
| CN | 105323075 | 2/2016 |
| CN | 105491190 | 4/2016 |
| CN | 105659667 | 6/2016 |
| CN | 106160887 | 11/2016 |
| CN | 106712800 | 5/2017 |
| CN | 106792774 | 5/2017 |
| CN | 107682039 | 2/2018 |
| CN | 108390734 | 8/2018 |
| CN | 108988903 | 12/2018 |
| CN | 208190649 | 12/2018 |
| CN | 109302245 | 2/2019 |
| CN | 109428177 | 3/2019 |
| CN | 109495911 | 3/2019 |
| CN | 208581234 | 3/2019 |
| CN | 109904626 | 6/2019 |
| CN | 209184819 | 7/2019 |
| CN | 111277293 | 6/2020 |
| CN | 111277309 | 6/2020 |
| EP | 2685638 | 1/2014 |
| EP | 2722722 | 4/2014 |
| EP | 3599724 | 1/2020 |
| WO | 2019016593 | 1/2019 |

OTHER PUBLICATIONS

SIPO, First Office Action for CN Application No. 202010072643.2, dated Mar. 8, 2021.

WIPO, International Search Report for PCT/CN2020/132323, dated Feb. 25, 2021.

WIPO, International Search Report for PCT/CN2020/131815, dated Feb. 25, 2021.

WIPO, International Search Report for PCT/CN2021/071747, dated Apr. 12, 2021.

EPO, Partial European Search Report for EP Application No. 20210823.9, dated May 7, 2021.

EPO, Extended European Search Report for EP Application No. 20210687.8, dated Apr. 30, 2021.

CNIPA, Notice of Grant of Patent Right for Invention for CN Application No. 202010072643.2, dated Jul. 27, 2021.

EPO, Extended European Search Report for EP Application No. 20210823.9, dated Aug. 9, 2021.

* cited by examiner

METHOD FOR ANTENNA SELECTION AND RELATED PRODUCTS

CROSS-REFERENCE TO RELATED APPLICATION(S)

This application claims priority to Chinese Patent Application No. 202010072643.2, filed on Jan. 21, 2020, the entire disclosure of which is hereby incorporated by reference.

TECHNICAL FIELD

This disclosure relates to the field of terminal equipment, and particularly to a method for antenna selection and related products.

BACKGROUND

Customer premise equipment (CPE) is a new client terminal for optical fiber user access network service and is used for providing services such as wired broadband. Generally, the CPE converts a network signal transmitted by a base station into a wireless-fidelity (Wi-Fi) signal. Since the network signal that CPE can receive is a wireless network signal, cost of laying wired networks can be saved. Therefore, the CPE can be widely used in occasions where no wired network is laid, such as rural areas, towns, hospitals, factories, cells, and the like.

If the CPE randomly selects an antenna to communicate with a base station, it is easy to select an antenna a signal that the antenna receives is a weak signal to receive a network signal of the base station, and in some cases due to occlusion of some objections a weak signal is received, which in turn makes a communication conducted via the CPE be poor and results in low signal stability and low user experience.

SUMMARY

In a first aspect of the disclosure, a user terminal equipment is provided. The user terminal equipment includes a radio frequency front-end module, an antenna module, and a processor. The radio frequency front-end module is configured to control antennas to receive and transmit radio frequency signals. The antenna module is configured to receive and transmit radio frequency signals and includes N internal antennas and M external antennas, where the M external antennas are electrically coupled to the radio frequency front-end module via a peripheral interface of the user terminal equipment, where N is an integer larger than 0, and M is a positive integer smaller than or equal to N. The processor is configured to select M internal antennas from the N internal antennas to receive and transmit radio frequency signals when the M external antennas are configured to receive and transmit radio frequency signals, to realize reception and transmission of radio frequency signals from 2M*2M channels.

In a second aspect of the disclosure, a method for antenna selection is provided. The method is applicable to a user terminal equipment including four internal-antenna groups and one external-antenna group, where the four internal-antenna groups are distributed around a periphery of the user terminal equipment, each internal-antenna group includes two internal antennas with different polarization directions, where the external-antenna group is electrically coupled to the user terminal equipment via a peripheral interface of the user terminal equipment. The method includes the following. Whether the user terminal equipment is coupled to the external-antenna group is determined. When the user terminal equipment is coupled to the external-antenna group and the external-antenna group is determined to be enabled, two target internal antennas are determined from any of the four internal-antenna groups or two adjacent internal-antenna groups among the four internal-antenna groups. A target antenna group is formed according to the two target internal antennas and two external antennas to receive and transmit radio frequency signals.

In a third aspect of the disclosure, an electronic device is provided. The electronic device includes four internal-antenna groups, one external-antenna group, at least one processor, and a non-transitory computer readable storage. The non-transitory computer readable storage is coupled to the at least one processor and stores at least one computer executable instruction thereon which, when executed by the at least one processor, causes the at least one processor to execute part or all of the operations of the method described in the first aspect.

BRIEF DESCRIPTION OF THE DRAWINGS

In order to describe technical solutions of implementations or the related art more clearly, the following will give a brief description of accompanying drawings used for describing the implementations or the related art. Apparently, accompanying drawings described below are merely some implementations. Those of ordinary skill in the art can also obtain other accompanying drawings based on the accompanying drawings described below without creative efforts.

DETAILED DESCRIPTION

Hereinafter, technical solutions embodied by the implementations of the disclosure will be described in a clear and comprehensive manner with reference to the accompanying drawings intended for the implementations. It is evident that the implementations described herein constitute merely some rather than all the implementations of the disclosure, and that those of ordinary skill in the art will be able to derive other implementations based on these implementations without making creative efforts, which all such derived implementations shall all fall in the protection scope of the disclosure.

The terms "first", "second", "third", "fourth", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "implementation" referred to herein means that particular features, structures, or properties described in conjunction with the implementations may be defined in at least one implementation of the disclosure. The phrase "implementation" appearing in various places in the specification does not necessarily refer to the same implementation or an independent/alternative implementation that is mutually exclusive with other implementations. Those skilled in the art will understand expressly and implicitly that an implementation described herein may be combined with other implementations.

Figure 1:
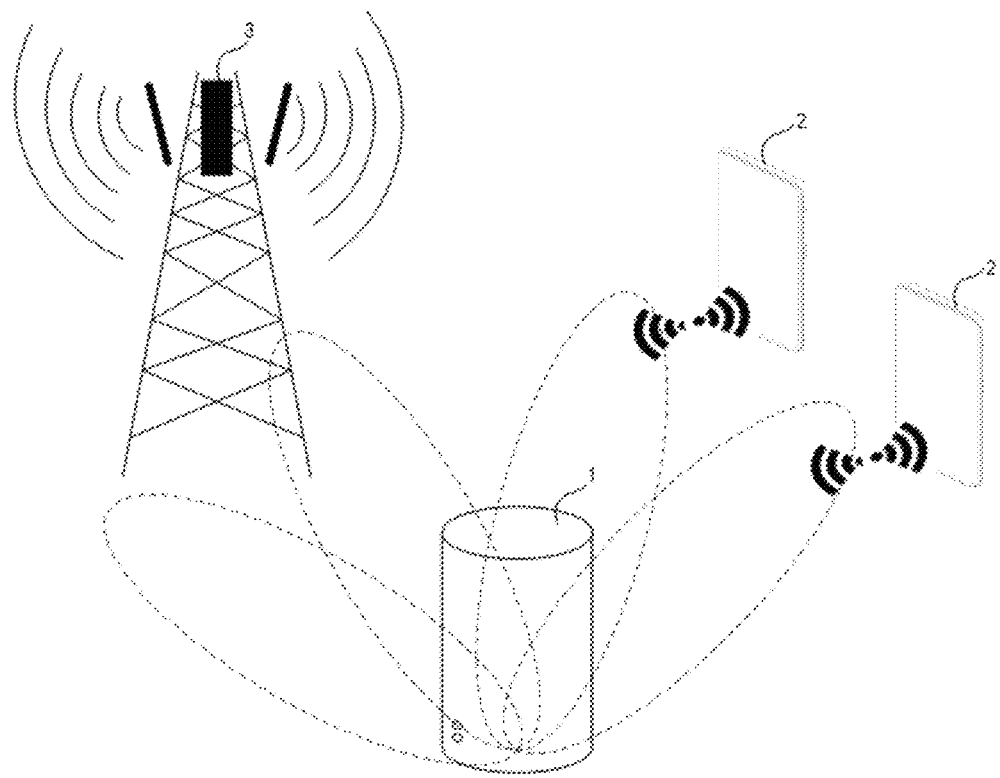
FIG. 1 is a schematic diagram illustrating a system architecture applicable to a user terminal equipment according to some implementations.

FIG. 1 is a schematic diagram illustrating an application system architecture for a user terminal equipment according to some implementations. A user terminal equipment 1 is a customer premises equipment (CPE). As illustrated in FIG. 1, the user terminal equipment 1 is configured to communicate with a base station 3, receive a first network signal transmitted by the base station 3, and convert the first network signal into a second network signal. The second network signal herein can be used by a terminal equipment 2 such as a tablet computer, a smart phone, a notebook computer, and the like. The first network signal may be, but is not limited to, a fifth generation mobile networks (5G) signal. The second network signal may be, but is not limited to, a wireless-fidelity (Wi-Fi) signal. The CPE can be widely applied to rural areas, towns, hospitals, factories, cells, and so on. The first network signal that the CPE can receive is a wireless network signal, so that cost of laying wired networks can be saved.

Figure 2:
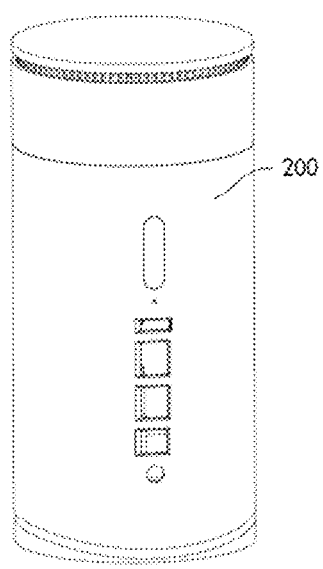
FIG. 2 is a schematic structural diagram illustrating a user terminal equipment according to some implementations.

FIG. 2 is a schematic structural diagram illustrating a user terminal equipment according to some implementations. As illustrated in FIG. 2, the user terminal equipment includes a casing 200. The casing 200 may be in a shape of a prism, a cylinder, or other shapes, which is not limited herein. The casing 200 may be made of an insulation material including but not limited to plastic. As illustrated in FIG. 2, the user terminal equipment further includes multiple interfaces. The multiple interfaces include an external interface(s) electrically coupled with an external-antenna group(s). The user terminal equipment further includes internal antennas and external antennas. The internal antennas and the external antennas are used to transmit and/or receive radio frequency signals. The user terminal equipment may be, but is not limited to, a CPE. The CPE is a new client terminal for optical fiber user access network service and is used for providing services such as wired broadband. The CPE is a mobile signal access equipment for receiving a mobile signal and forwarding the mobile signal in a form of a wireless Wi-Fi signal, and is also an equipment for converting a network signal transmitted by a base station into a Wi-Fi signal. In this implementation, the user terminal equipment selects four antennas from the internal antennas and the external antennas to transmit and/or receive radio frequency signals, for example, to receive a first signal transmitted by the base station, convert the first signal into a second signal, and transmit the second signal to terminal equipments such as smart phones and tablet computers.

Figure 3:
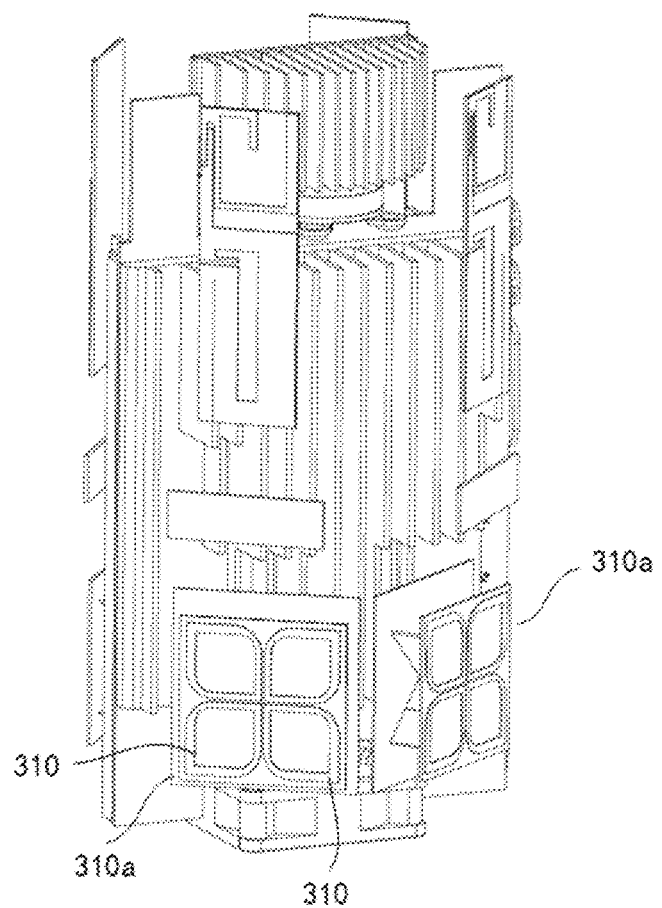
FIG. 3 is a schematic structural diagram illustrating the user terminal equipment illustrated in FIG. 2 according to some implementations, a casing of the user terminal equipment being removed.

FIG. 3 is a schematic structural diagram illustrating the user terminal equipment illustrated in FIG. 2 according to some implementations, where the casing of the user terminal equipment is removed. The user terminal equipment includes N/2 internal-antenna groups 310a and a signal conversion device. Although not illustrated in the figures, the user terminal equipment further includes M/2 external-antenna groups and an electrical peripheral interface(s). The N/2 internal-antenna groups 310a are distributed around a periphery of the user terminal equipment. Each internal-antenna group 310a includes two internal antennas 310. Two internal antennas 310 of each internal-antenna group 310a have a same orientation and different polarization directions. One external-antenna group includes two external antennas. The external-antenna group is electrically coupled to the user terminal equipment via the peripheral interface of the user terminal equipment. The internal antennas 310 and the external antennas are used to receive a first network signal. The signal conversion device is configured to select two internal antennas 310 from N internal antennas 310 (where N is equal to 8) and two external antennas to receive a first network signal, and convert the first network signal received by the two selected internal antennas 310 and the two selected external antennas into a second network signal. The signal conversion device is configured to select two internal antennas 310 from the N internal antennas 310 (where N is equal to 2) to receive a first network signal, and convert the first network signal received by the two selected internal antennas 310 into a second network signal.

In this implementation, N is equal to 8, and M is equal to to 2. In other implementations, N and M may be other values, which is not limited herein.

The internal antenna 310 may be, but is not limited to, a receiving antenna for millimeter wave signals or terahertz signals. Accordingly, the first network signal may be, but is not limited to, a millimeter wave signal or a terahertz signal. Currently, in the 5G, according to the specification of the 3GPP TS 38.101 protocol, two frequency ranges are mainly available for 5G new radio (NR): frequency range FR1 and frequency range FR2. The frequency range FR1 is 450 MHz~6 GHz, also known as the sub-6 GHz; the frequency range FR2 is 24.25 GHz~52.6 GHz, usually called millimeter wave (mm Wave) frequency range. 3GPP (release 15) specifies the present 5G millimeter wave as follows: n257 (26.5~29.5 GHz), n258 (24.25~27.5 GHz), n261 (27.5~28.35 GHz), and n260 (37~40 GHz). Millimeter wave signal or terahertz signals both have a high transmission speed. However, millimeter wave signals or terahertz signals are easily blocked by an external object. When there is an occlusion between the internal antenna 310 and the base station 3, a signal strength of the first network signal received by the internal antenna 310 is relatively low. In this case, if the first network signal having a low signal strength is converted into the second network signal, a signal strength of the obtained second network signal may also be relatively low. In explanation of the implementations, the internal antenna 310 is a receiving antenna for sub-6 GHz signal. Accordingly, the first network signal is a radio frequency signal at a sub-6GH, and the second network signal may be, but is not limited to, a Wi-Fi signal.

The N/2 internal-antenna groups 310a may be disposed around the periphery of the user terminal equipment, which is not limited to a case where the N/2 internal-antenna groups 310a form one or more circles around the inside of the casing 200. The N/2 internal-antenna groups 310a may be directly or indirectly disposed on an inner wall of the casing 200 or disposed on other components, as long as the N/2 internal-antenna groups 310a are distributed around the periphery of the user terminal equipment.

Due to uncertainty of a position of the base station 3 transmitting the first network signal, a transmission direction of the first network signal is uncertain. Signal strengths of first network signals received by the internal antennas 310 in various directions are different. For example, when there is an occlusion object between the internal antenna 310 and the base station 3, a signal strength of the first network signal received by the internal antenna 310 is relatively low. In this case, if the first network signal having a low signal strength is converted into the second network signal, a signal strength of the obtained second network signal may also be relatively low. According to the disclosure, multiple internal antennas 310 are distributed around the periphery of the user terminal equipment, such that the internal antennas 310 can detect first network signals from multiple directions. In this way, accuracy of determining a first network signal having the highest signal strength according to different signal strengths of the collected first network signals can be improved, thereby providing a necessary basis for obtaining a second network signal having a relatively high signal strength. The signal conversion device is configured to select a first network signal having the strongest signal strength received by one or more internal antennas 310 and convert the first network signal into a second network signal, so that the converted second network signal is improved in signal strength.

In addition, the first network signal transmitted by the base station 3 exhibits elliptical polarization due to scattering and other factors during propagation to the user terminal equipment. Generally, the internal antenna 310 in a certain polarization direction is unable to receive all energy of the first network signal, or the energy of the first network signal received by the internal antenna 310 in a certain polarization direction is very low. In the disclosure, two internal antennas 310 in one internal-antenna group 310a are different in polarization direction, which can improve probability of receiving, by the two internal antennas 310 in the internal-antenna group 310a, the first network signal with relatively high energy.

In some implementations, one internal-antenna group 310a includes two internal antennas 310, and one of the two internal antennas 310 in a same internal-antenna group 310a has a first polarization direction, and the other of the two internal antennas 310 in the same internal-antenna group 310a has a second polarization direction, where the first polarization direction and the second polarization direction are ±45° polarization direction, respectively.

As described above, the first network signal transmitted by the base station 3 exhibits elliptical polarization due to scattering and other factors during propagation to the user terminal equipment. A single internal antenna 310 having a horizontal polarization direction or a vertical polarization direction is unable to receive all the energy. In order to receive as much energy of the first network signal as possible, two internal antennas 310 polarization directions of which are perpendicular to each other are in one internal-antenna group 310a to receive the first network signal. As such, the energy of the first network signal can be received through the internal-antenna group 310a in any cases. However, during transmission of the first network signal with vertical polarization or horizontal polarization, the first network signal becomes a first network signal with elliptical polarization, and the first network signal with elliptical polarization has inconsistent components in the vertical direction and the horizontal direction. If two internal antennas 310 with 0° and 90° linear polarizations are respectively in the internal-antenna group 310a, most of the energy of the first network signal is received by one of the internal antennas 310. To ensure that two internal antennas 310 in a same internal-antenna group 310a can be used effectively, the two internal antennas 310 in the same internal-antenna group 310a are respectively set to have ±45° polarization directions, so that each internal antenna 310 in the same internal-antenna group 310a can effectively receive the first network signal.

As can be seen, according to the implementations of the disclosure, the user terminal equipment can determine whether the user terminal equipment is coupled to the external-antenna group. When the user terminal equipment is coupled to the external-antenna group and the external-antenna group is determined to be enabled, two target internal antennas are determined from any of the four internal-antenna groups or two adjacent internal-antenna groups among the four internal-antenna groups. The target antenna group is formed according to the two target internal antennas and the two external antennas to receive and transmit radio frequency signals. When the terminal equipment is coupled to the external-antenna group, the two target internal antennas are determined from the internal-antenna groups to receive and transmit radio frequency signals. In this way, the terminal equipment can access a current network in an optimal signal direction, which is beneficial to enhancing signal stability and improving user experience.

Figure 4:
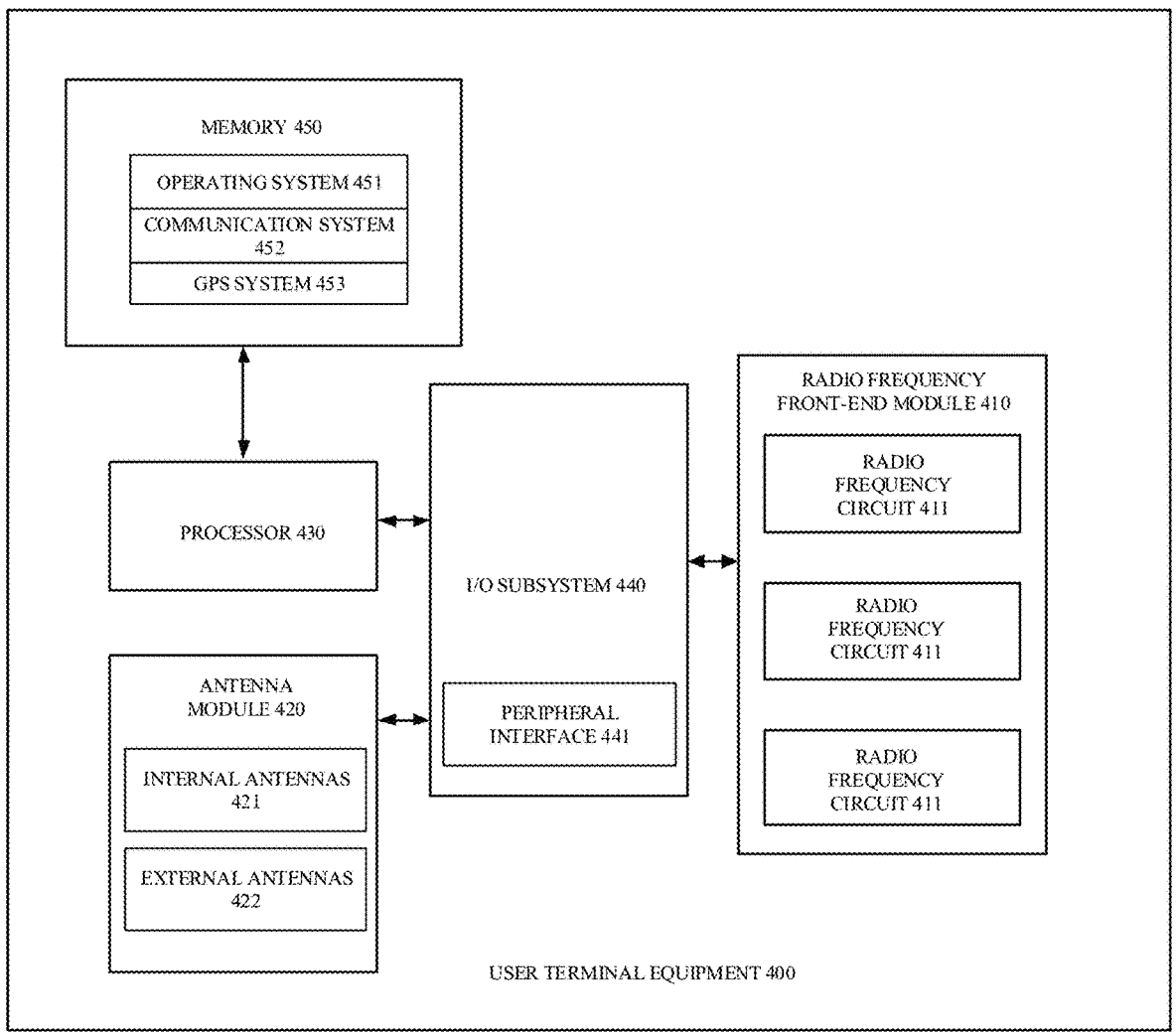
FIG. 4 is a block diagram illustrating module composition of a user terminal equipment according to some implementations.

FIG. 4 is a block diagram illustrating a module architecture of a user terminal equipment 400 according to some implementations. The user terminal equipment 400 is applicable to a terminal equipment. The user terminal equipment 400 includes a radio frequency front-end module 410, an antenna module 420, a processor 430, an input/output (I/O) subsystem 440, and a memory 450.

The radio frequency front-end module 410 is configured to control antennas to receive and transmit radio frequency signals, where the radio frequency front-end module 410 includes multiple radio frequency circuits 411.

The antenna module 420 is configured to receive and transmit radio frequency signals. The antenna module 420 includes N internal antennas 421 and M external antennas 422. The M external antennas are electrically coupled to the radio frequency front-end module via a peripheral interface 441 of the I/O subsystem 440, where N is an integer larger than 0, and M is a positive integer smaller than N.

The processor 430 is configured to select M internal antennas from the N internal antennas to receive and transmit radio frequency signals when the M external antennas are configured to receive and transmit radio frequency signals, to realize reception and transmission of radio frequency signals from 2M*2M channels.

The memory 450 further includes an operating system 451, a communication system 452, and a global position system (GPS) system 453.

Figure 5:
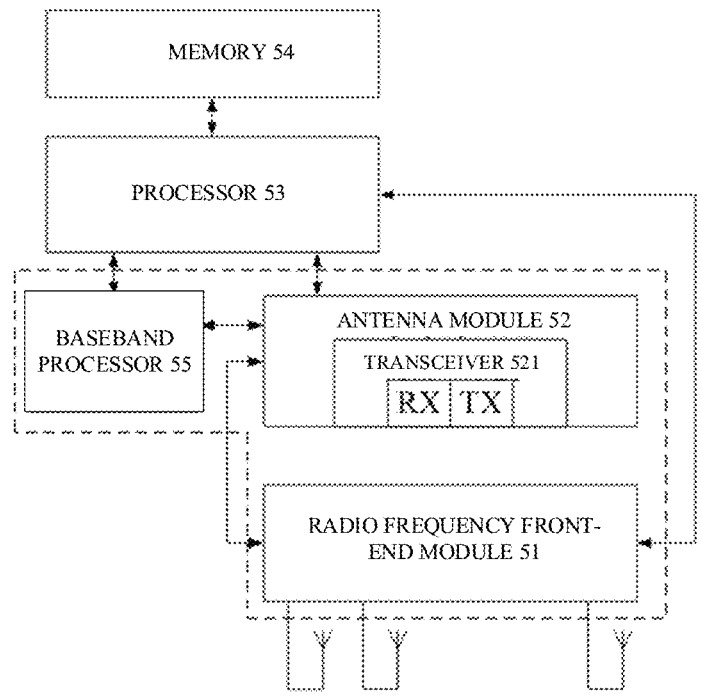
FIG. 5 is a circuit diagram of a user terminal equipment according to some implementations.

Similar to the foregoing implementations, FIG. 5 is a circuit diagram illustrating a user terminal equipment according to some implementations. As illustrated in FIG. 5, in this implementation, a radio frequency front-end module 51 is electrically coupled to an antenna module 52. The antenna module 52 includes a transceiver(s) 521, where the transceiver 521 includes a TX end for transmitting data and an RX end for receiving data. The radio frequency front-end module 51 is configured to control the transceiver 521 of the antenna module 52 to receive and transmit radio frequency signals. The radio frequency front-end module 51 is electrically coupled to a processor 53. The processor 53 is electrically coupled to the antenna module 52. The processor 53 is configured to select two or more transceivers 521 from the antenna module 52 to receive and transmit radio frequency signals. The antenna module 52 is electrically coupled to a baseband processor 55. The baseband processor 55 is configured to receive a first radio frequency signal collected by the antenna module 52, convert the first radio frequency signal into a second radio frequency signal, and transmit the second radio frequency signal via the antenna module 52. The baseband processor 55 is electrically coupled to the processor 53. The processor 53 is configured to control conversion operations between the first radio frequency signal and the second radio frequency signal performed in the baseband processor 55. The processor 53 is electrically coupled to a memory 54. The memory 54 is configured to store antenna data. The antenna data may include a historical optimal antenna group. The processor 53 is configured to select at least one transceiver 521 in the antenna module 52 according to the historical optimal antenna group.

As can be seen, according to the implementations of the disclosure, the user terminal equipment can determine whether the user terminal equipment is coupled to the external-antenna group, where the external-antenna group includes a first external antenna and a second external antenna. When the user terminal equipment is coupled to the external-antenna group and the external-antenna group is determined to be enabled, an edge selection algorithm is executed for the internal-antenna groups and the external-antenna group to determine a first candidate antenna group, where the first candidate antenna group includes a first internal antenna, a second internal antenna, and the external-antenna group. A target antenna group is determined with a corner selection algorithm based on the first candidate antenna group. In this way, when the terminal equipment is coupled to the external-antenna group, the target antenna group for accessing a current network is determined according to the external-antenna group and the first and second internal antennas determined from the internal-antenna groups, so that the terminal equipment can access the current network in an optimal signal direction, which is beneficial to enhancing signal stability and improving user experience.

In some implementations, the N internal antennas of the antenna module 420 are divided into N/2 internal-antenna groups. Each internal-antenna group includes a first antenna in a first polarization direction and a second antenna in a second polarization direction. The N/2 internal-antenna groups are respectively distributed on N/2 different planes of the user terminal equipment.

The user terminal equipment may be a cylinder, a cube, or the like. The N internal antennas are grouped in pairs to obtain multiple internal-antenna groups, and the multiple internal-antenna groups are evenly distributed on multiple planes of the user terminal equipment.

In some implementations, the N internal antennas of the antenna module 420 are embodied as eight internal antennas, and the M external antennas are embodied as two external antennas. The eight internal antennas are divided into four internal-antenna groups. The four internal-antenna groups are distributed around a periphery of the user terminal equipment. Each of the four internal-antenna groups includes a first antenna in a first polarization direction and a second antenna in a second polarization direction.

Figure 6:
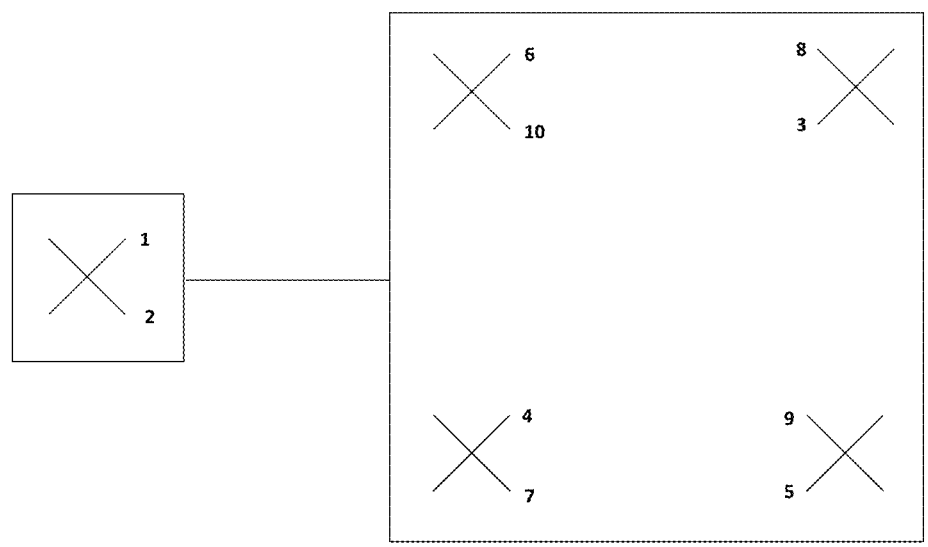
FIG. 6 is a schematic diagram illustrating antenna distribution of internal-antenna groups and an external-antenna group of a user terminal equipment according to some implementations.

FIG. 6 is a schematic diagram illustrating antenna distribution of internal-antenna groups and an external-antenna group of a user terminal equipment according to some implementations. In some implementations, as illustrated in FIG. 6, an external antenna 1 and an external antenna 2 form an external-antenna group. The external-antenna group is coupled to the user terminal equipment via an electrical peripheral interface of the user terminal equipment. An internal antenna 6 and an internal antenna 10 form an internal-antenna group, called internal-antenna group 1, an internal antenna 8 and an internal antenna 3 belong to an internal-antenna group recorded as internal-antenna group 2, an internal antenna 4 and an internal antenna 7 form an internal-antenna group, called internal-antenna group 3, and an internal antenna 9 and an internal antenna 5 form an internal-antenna group, called internal-antenna group 4. The combinations of the foregoing four internal-antenna groups may include: the combination of the internal-antenna group 1 and the internal-antenna group 2, the combination of the internal-antenna group 1 and the internal-antenna group 3, the combination of the internal-antenna group 2 and the internal-antenna group 4, and the combination of the internal-antenna group 3 and the internal-antenna group 4.

In some implementations, the processor 430 is configured to select two target internal antennas from the eight internal antennas to receive and transmit radio frequency signals when the two external antennas are configured to receive and transmit radio frequency signals.

In some implementations, in terms of determining the two target internal antennas from any of the four internal-antenna groups or two adjacent internal-antenna groups among the four internal-antenna groups, the processor 430 is configured to: group the four internal-antenna groups to obtain four internal-antenna group combinations, where each of the four internal-antenna group combinations includes two adjacent internal-antenna groups; and determine the two target internal antennas from any of the four internal-antenna group combinations.

In some implementations, the processor 430 is configured to: determine whether the user terminal equipment is coupled to the external-antenna group when two external antennas (of the external-antenna group) are configured to receive and transmit radio frequency signals; and determine the two target internal antennas from any of the four internal-antenna groups or from two adjacent internal-antenna groups among the four internal-antenna groups when the user terminal equipment is coupled to the external-antenna group and the external-antenna group is determined to be enabled. The radio frequency front-end module is configured to control the two target internal antennas and the two external antennas to receive and transmit radio frequency signals.

The external-antenna group includes a first external antenna and a second external antenna. The external-antenna group may be an electronic device including the first external antenna and the second external antenna, or an external hardware module including the first external antenna and the second external antenna. The first external antenna and the second external antenna may be remote external antennas.

In some implementations, when the terminal equipment is detected to be powered on, an external-antenna detection request is transmitted to a hardware module via an internal communication link, where the external-antenna detection request is used to request the hardware module to detect whether a peripheral interface is electrically connected to the external-antenna group, an external-connection detection response transmitted by the hardware module is received, and whether the peripheral interface is connected to the external-antenna group is determined according to the external-connection detection response.

In some implementations, in terms of determining the two target internal antennas from two adjacent internal-antenna groups among the four internal-antenna groups, the processor 430 is configured to: select two adjacent internal-antenna groups from the four internal-antenna groups; and select one internal antenna from each of the two selected adjacent internal-antenna groups to determine two target internal antennas, so as to determine multiple sets of the two target internal antennas.

In some implementations, in terms of selecting two adjacent internal-antenna groups from the four internal-antenna groups and selecting one internal antenna from each of the two selected adjacent internal-antenna groups to determine two target internal antennas, the processor 430 is configured to obtain multiple signal receiving quality values (signal receiving quality is indicative of the quality of a recived signal) by performing the following operations for each of multiple internal-antenna group combinations, where the multiple internal-antenna group combinations are combinations of internal-antenna groups which are obtained by grouping the four internal-antenna groups according to a preset neighboring relationship, and each internal-antenna group combination includes two internal-antenna groups. For each of the multiple internal-antenna group combinations: one internal antenna is selected from each of two internal-antenna groups of a currently processed internal-antenna group combination to determine two internal antennas; the two determined internal antennas and the two external antennas are enabled; and a current signal receiving quality value of the user terminal equipment is received. The processor 430 is further configured to obtain a maximum signal receiving quality value from multiple signal receiving quality values (the maximum signal receiving quality value refers to a signal receiving quality value which is the maximum among the multiple signal receiving quality values). The processor 430 is configured to determine the two target internal antennas according to the maximum signal receiving quality value and two internal antennas corresponding to the maximum signal receiving quality value.

In some implementations, the multiple internal-antenna group combinations are embodied as internal-antenna group combinations obtained by grouping the four internal-antenna groups according to a preset neighboring relationship, where the multiple internal-antenna group combinations include: the combination of the internal-antenna group 1 and the internal-antenna group 2, the combination of the internal-antenna group 2 and the internal-antenna group 3, the combination of the internal-antenna group 3 and the internal-antenna group 4, and the combination of the internal-antenna group 1 and the internal-antenna group 4.

In some implementations, one internal antenna is selected from each of two internal-antenna groups of a currently processed internal-antenna group combination to determine two internal antennas, where the two determined internal antennas form an antenna scheme. As such, multiple antenna schemes can be obtained by selecting one internal antenna from each of two internal-antenna groups in each of four internal-antenna group combinations. The multiple antenna schemes include the following.

| antenna scheme | internal antenna |
| --- | --- |
| 1 | internal antenna 6, internal antenna 3 |
| 2 | internal antenna 6, internal antenna 4 |
| 3 | internal antenna 6, internal antenna 7 |
| 4 | internal antenna 6, internal antenna 8 |
| 5 | internal antenna 5, internal antenna 3 |
| 6 | internal antenna 5, internal antenna 4 |
| 7 | internal antenna 5, internal antenna 7 |
| 8 | internal antenna 5, internal antenna 8 |
| 9 | internal antenna 10, internal antenna 3 |
| 10 | internal antenna 10, internal antenna 4 |
| 11 | internal antenna 10, internal antenna 7 |
| 12 | internal antenna 10, internal antenna 8 |
| 13 | internal antenna 9, internal antenna 3 |
| 14 | internal antenna 9, internal antenna 4 |
| 15 | internal antenna 9, internal antenna 7 |
| 16 | internal antenna 9, internal antenna 8 |

In some implementations, the radio frequency front-end module 410 is configured to: enable each set of the two internal antennas and the two external antennas, and receive a signal receiving quality value of the user terminal equipment to obtain multiple signal receiving quality values. The processor 430 is further configured to obtain a maximum signal receiving quality value from the multiple signal receiving quality values, and control the radio frequency front-end module to enable a set of the two target internal antennas corresponding to the maximum signal receiving quality value and the two external antennas to receive and transmit radio frequency signals.

Figure 7:
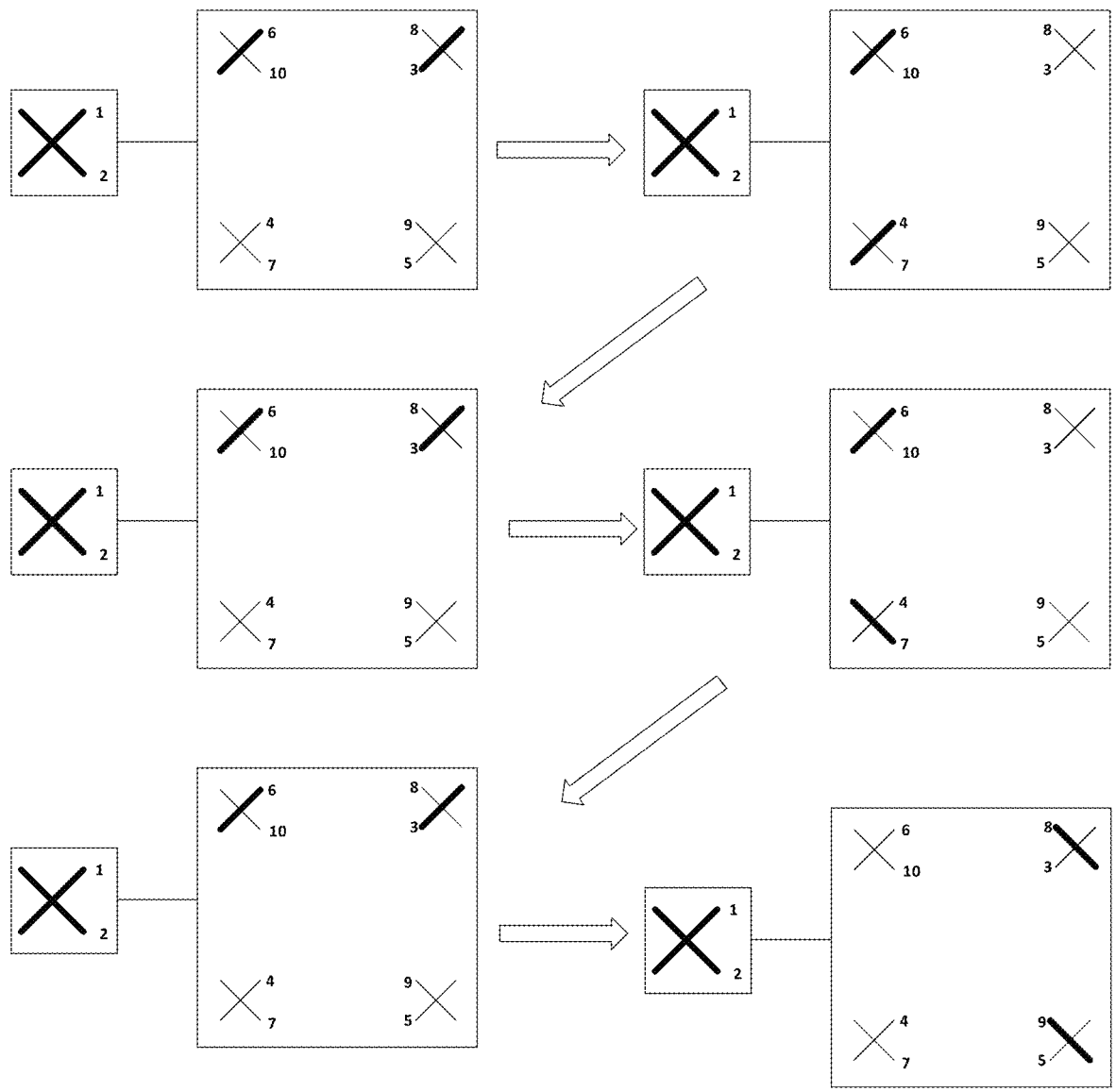
FIG. 7 is a schematic flowchart illustrating antenna-scheme traversal selection according to some implementations.

As an example, the foregoing implementation may include the following. A traversal selection operation for the multiple antenna schemes is performed. Specifically, an initial scheme 1 (e.g., the external antenna 1, the external antenna 2, the internal antenna 6, and the internal antenna 3) is obtained by combining the external antennas and the antenna scheme 1 in the multiple antenna schemes, and a current signal receiving quality value of the user terminal equipment (recorded as signal receiving quality value 1) is received. An initial scheme 2 (e.g., the external antenna 1, the external antenna 2, the internal antenna 6, and the internal antenna 4) is obtained by combining the external antennas and the antenna scheme 2 in the multiple antenna schemes, the antenna group in the initial scheme 2 is switched to be a current antenna group of the terminal equipment, and a current signal receiving quality value of the terminal equipment (recorded as signal receiving quality value 2) is received. The antenna group in the initial scheme 1 is switched back to be the current antenna group of the terminal equipment. An initial scheme 3 (e.g., the external antenna 1, the external antenna 2, the internal antenna 6, and the internal antenna 7) is obtained by combining the external antennas and the antennas 3 in the antenna scheme 3 in the multiple antenna schemes, the antenna group in the initial scheme 3 is switched to be the current antenna group of the terminal equipment, and a current signal receiving quality value of the user terminal equipment (recorded as signal receiving quality value 3) is received. The antenna group in the initial scheme 1 is switched back to be the current antenna group of the terminal equipment until the traversal operation for the multiple antenna schemes ends, as illustrated in FIG. 7.

In some implementations, after the traversal operation for the multiple antenna schemes is completed, multiple signal receiving quality values are obtained, a maximum signal receiving quality value is obtained from the multiple signal receiving quality values (the maximum signal receiving quality value refers to a signal receiving quality value which is the maximum among the multiple signal receiving quality values), and the two target internal antennas are determined according to the maximum signal receiving quality value and two internal antennas corresponding to the maximum signal receiving quality value.

In some implementations, the two target internal antennas are determined according to the maximum signal receiving quality value and the two internal antennas corresponding to the maximum signal receiving quality value as follows. Two internal-antenna groups to which the two internal antennas corresponding to the maximum signal receiving quality value belong are determined. For the two determined internal-antenna groups, obtain two signal receiving quality values respectively corresponding to the two internal-antenna groups as follows. For each of the two determined internal-antenna groups, enable two internal antennas in the internal-antenna group and the two external antennas, and receive a current signal receiving quality value of the user terminal equipment. Determine which of the maximum signal receiving quality value and the two signal receiving quality values is maximum. If the maximum signal receiving quality value is maximum among the maximum signal receiving quality value and the two signal receiving quality values, the two internal antennas are determined to be the two target internal antennas. If one of the two signal receiving quality values is maximum among the maximum signal receiving quality value and the two signal receiving quality values, two internal antennas in an internal-antenna group corresponding to the one of the two signal receiving quality values are determined to be the two target internal antennas.

Figure 8:
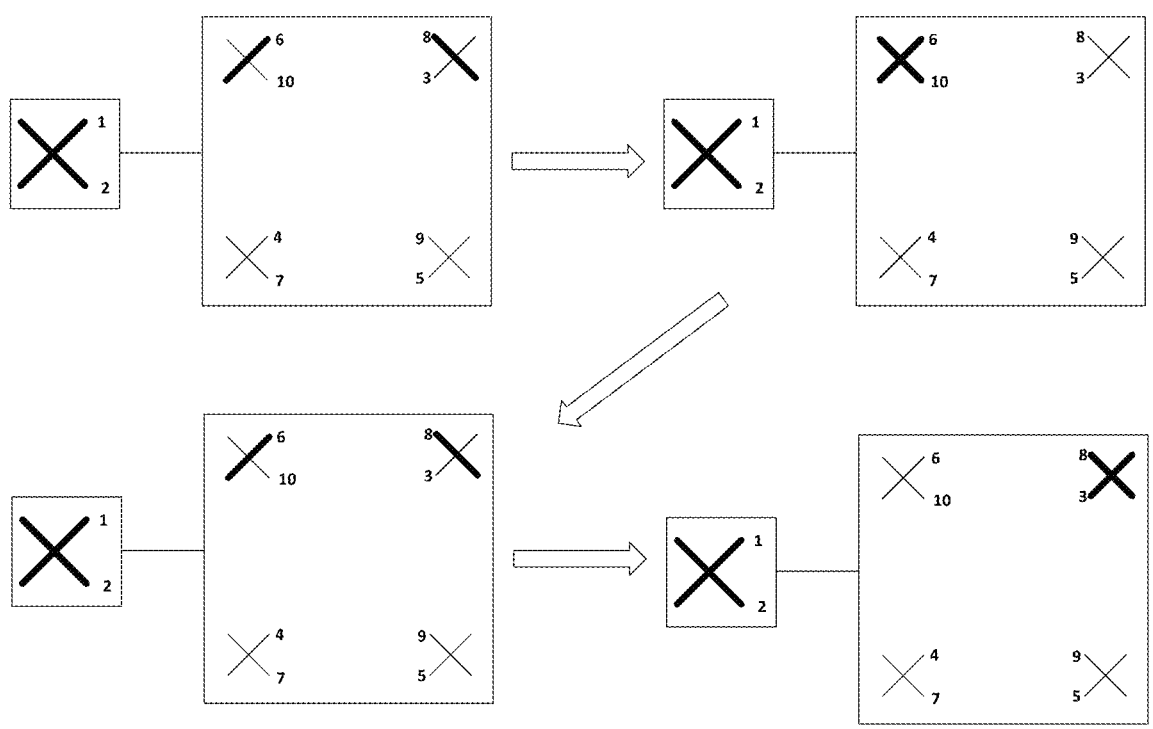
FIG. 8 is a schematic flowchart illustrating antenna-scheme traversal selection according to other implementations.

If the two internal antennas are the internal antenna 6 and the internal antenna 8, the two internal-antenna groups to which the two internal antennas belong are determined to be the internal-antenna group 1 and the internal-antenna group 2. The internal antenna 8 is disabled, the internal antenna 10 in the internal-antenna group 1 is enabled, and a current signal receiving quality value 1' of the user terminal equipment is received. The internal antenna 10 is disabled, the internal antenna 8 is enabled, and when a network connection of the user terminal equipment is stable, the internal antenna 6 is disabled and the internal antenna 3 in the internal-antenna group 2 is enabled, and a current signal receiving quality value 2' of the user terminal equipment is received. As illustrated in FIG. 8, determine which of the signal receiving quality value 1', the signal receiving quality value 2', and the maximum signal receiving quality value is maximum. If the signal receiving quality value 1' is maximum among the signal receiving quality value 1', the signal receiving quality value 2', and the maximum signal receiving quality value, the internal antenna 6 and the internal antenna 10 are determined to be the two target internal antennas. If the signal receiving quality 2' is maximum among the signal receiving quality value 1', the signal receiving quality value 2', and the maximum signal receiving quality value, the internal antenna 3 and the internal antenna 8 are determined to be the two target internal antennas. If the maximum signal receiving quality value is maximum among the signal receiving quality value 1', the signal receiving quality value 2', and the maximum signal receiving quality value, the internal antenna 6 and the internal antenna 8 are determined to be the two target internal antennas.

In some implementations, the processor 430 is configured to determine whether the user terminal equipment is coupled to the external-antenna group when the two external antennas are configured to receive and transmit radio frequency signals, and select two internal antennas in a same internal-antenna group among the four internal-antenna groups as the two target internal antennas when the user terminal equipment is connected to the external-antenna group and the external-antenna group is determined to be enabled, so as to determine multiple sets of the two target internal antennas.

In some implementations, two internal antennas in a same internal-antenna group among the four internal-antenna groups are selected as the two target internal antennas as follows. For the four internal-antenna groups, four signal receiving quality values corresponding to the four internal-antenna groups are obtained as follows. Select two internal antennas in any of the four internal-antenna groups. Enabling the two selected internal antennas and the two external antennas, and receive a current signal receiving quality value of the user terminal equipment. A maximum signal receiving quality value is obtained from the four signal receiving quality values (the maximum signal receiving quality value refers to a signal receiving quality value which is the maximum among the four signal receiving quality values). The two target internal antennas are determined according to the maximum signal receiving quality value and two internal antennas corresponding to the maximum signal receiving quality value.

In some implementations, the radio frequency front-end module 410 is configured to: control each set of the two target internal antennas and the two external antennas to receive and transmit radio frequency signals, and receive a signal receiving quality value of the user terminal equipment, so as to obtain multiple signal receiving quality values. The processor 430 is further configured to: obtain a maximum signal receiving quality value among the multiple signal receiving quality values, and control the radio frequency front-end module to enable a set of the two target internal antennas corresponding to the maximum signal receiving quality value and the two external antennas to receive and transmit radio frequency signals.

Figure 9:
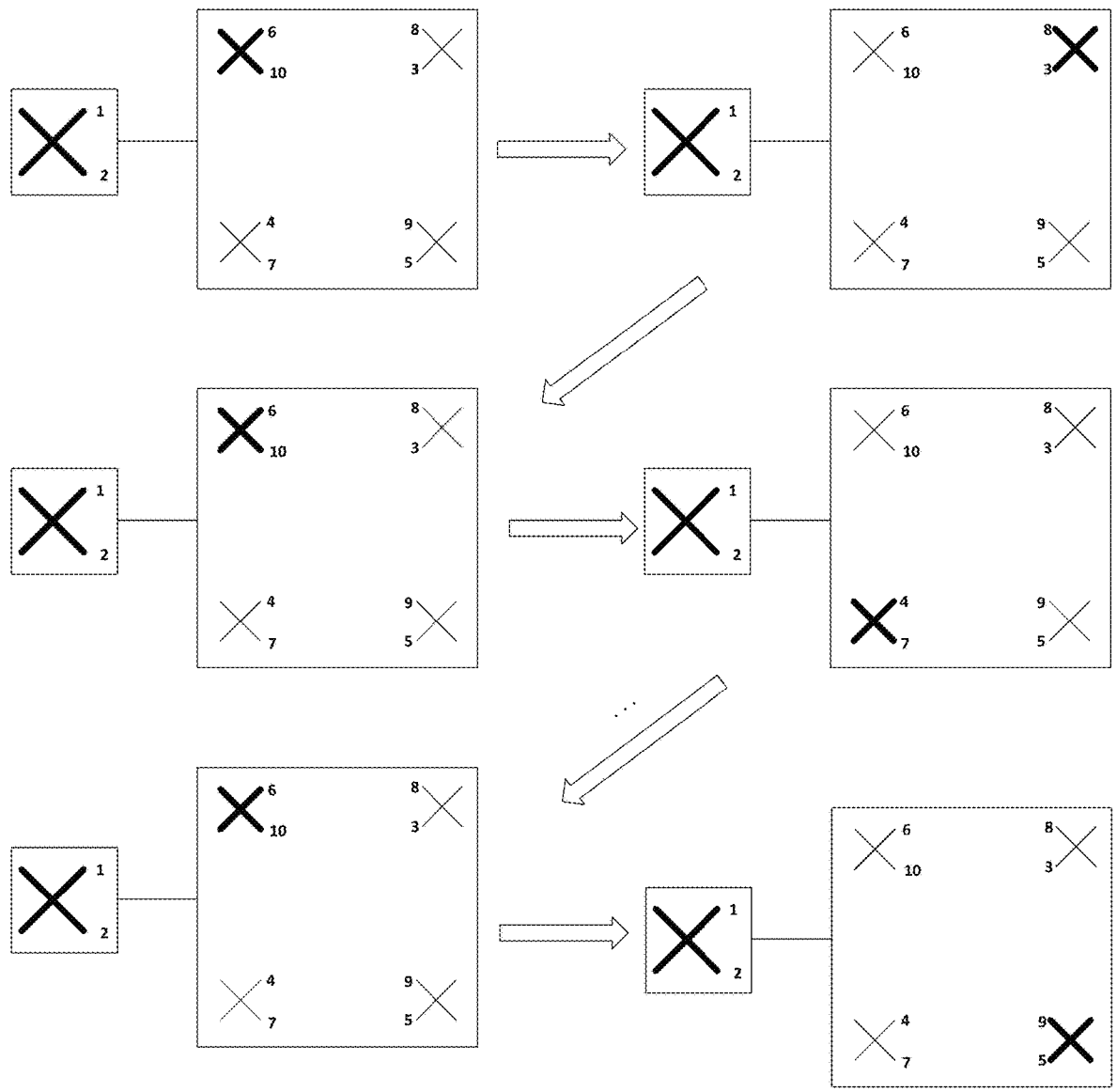
FIG. 9 is a schematic flowchart illustrating antenna-scheme traversal selection according to other implementations.

As an example, the foregoing implementation may include the following. A first scheme (i.e., the external antenna 1, the external antenna 2, the internal antenna 6, and the internal antenna 10) is obtained by combining the external antennas and the internal-antenna group 1 in the four internal-antenna groups, and a current signal receiving quality value of the user terminal equipment (recorded as first signal receiving quality value) is received. A second scheme (i.e., the external antenna 1, the external antenna 2, the internal antenna 3, and the internal antenna 8) is obtained by combining the external antennas and the internal-antenna group 2 selected from the four internal-antenna groups, the antenna group in the second scheme is switched to be a current antenna group of the terminal equipment, and a current signal receiving quality value of the user terminal equipment (recorded as second signal receiving quality value) is received. The antenna group in the first scheme is switched back to be the current antenna group of the terminal equipment. A third scheme (i.e., the external antenna 1, the external antenna 2, the internal antenna 4, and the internal antenna 7) is obtained by combining the external antennas and the internal-antenna group 3 selected from the four internal-antenna groups, the antenna group in the third scheme is switched to be the current antenna group of the terminal equipment, and a current signal receiving quality value of the user terminal equipment (recorded as third signal receiving quality value) is received. The antenna group in the first scheme is switched back to be the current antenna group of the terminal equipment. A fourth scheme (i.e., the external antenna 1, the external antenna 2, the internal antenna 5, and the internal antenna 9) is obtained by combining the external antennas and the internal-antenna group 4 selected from the four internal-antenna groups, the antenna group in the fourth scheme is switched to be the current antenna group of the terminal equipment, and a current signal receiving quality value of the user terminal equipment (recorded as fourth signal receiving quality value) is received, as illustrated in FIG. 9. A maximum signal receiving quality value among the first signal receiving quality value, the second signal receiving quality value, the third signal receiving quality value, and the fourth signal receiving quality value is determined. The two target internal antennas are determined according to the maximum signal receiving quality value and two internal antennas corresponding to the maximum signal receiving quality value.

Further, the two target internal antennas are determined according to the maximum signal receiving quality value and the two internal antennas corresponding to the maximum signal receiving quality value as follows. An internal-antenna group corresponding to the maximum signal receiving quality value is determined, for example, the internal-antenna group is the internal-antenna group 1. The internal-antenna group 2 and the internal-antenna group 3 adjacent to the internal-antenna group 1 are determined. The internal-antenna group 1 is disabled. One internal antenna selected from the internal-antenna group 3 and one internal antenna selected from the internal-antenna group 2 are enabled, and a current signal receiving quality value of the user terminal equipment is received, such that multiple signal receiving quality values are obtained after repetition of the above operation. A maximum value of the multiple signal receiving quality values and the maximum signal receiving quality value is determined. Two internal antennas corresponding to the maximum value are determined as the two target internal antennas.

In some implementations, before determining the two target internal antennas from any of the four internal-antenna groups or two adjacent internal-antenna groups among the four internal-antenna groups, the following operations are further included. A historical optimal antenna group is obtained, where the historical optimal antenna group includes the two external antennas and two historical optimal internal antennas. Whether the two historical optimal internal antennas are two internal antennas corresponding to the maximum signal receiving quality value is determined. If yes, the two internal antennas corresponding to the maximum signal receiving quality value are determined as the two target internal antennas. If not, proceed to the determining of the two target internal antennas according to the maximum signal receiving quality value and the two internal antennas corresponding to the maximum signal receiving quality value.

In some implementations, the historical optimal antenna group is obtained, where the historical optimal antenna group includes a combination of four internal antennas or a combination of two internal antennas and two external antennas. Assume the historical optimal antenna group is embodied as a combination of four internal antennas, the historical optimal antenna group is different from an antenna group corresponding to a current maximum signal receiving quality value, and thus determine the two target internal antennas according to the maximum signal receiving quality value and the two internal antennas corresponding to the maximum signal receiving quality value. Assume the historical optimal antenna group is embodied as a combination of two external antennas and two internal antennas, the two internal antennas are the two historical optimal internal antennas), and whether the two historical optimal internal antennas are the two internal antennas corresponding to the maximum signal receiving quality value is determined. If yes, the two internal antennas corresponding to the maximum signal receiving quality value are determined as the two target internal antennas. If not, determine the two target internal antennas according to the maximum signal receiving quality value and the two internal antennas corresponding to the maximum signal receiving quality value.

In some implementations, after controlling the radio frequency front-end module to enable a set of the two target internal antennas corresponding to the maximum signal receiving quality value and the two external antennas to receive and transmit radio frequency signals, the following operations are further performed. Search for and access a connectable network access point in a current environment based on the target antenna group. In a preset time period, a reference signal receiving power (RSRP) for a first external antenna in the target antenna group, a reference signal receiving power for a second external antenna in the target antenna group, a reference signal receiving power for a first internal antenna in the target antenna group, and a reference signal receiving power for a second internal antenna in the target antenna group are obtained. Power differences for the reference signal receiving power for the first internal antenna, the reference signal receiving power for the second internal antenna, the reference signal receiving power for the first external antenna, and the reference signal receiving power for the second external antenna are calculated, to obtain an antenna power-difference set, where the antenna power-difference set includes: a first power difference, a second power difference, a third power difference, and a fourth power difference. If the antenna power-difference set includes at least one power difference smaller than or equal to a preset power-difference threshold, the target antenna group is updated according to the four internal-antenna groups.

The preset time period may be 10 minutes, 30 minutes, 60 minutes, or the like, which is not limited herein.

The first power difference is a power difference between the reference signal receiving power for the first external antenna and the reference signal receiving power for the first internal antenna. The second power difference is a power difference between the reference signal receiving power for the first external antenna and the reference signal receiving power for the second internal antenna. The third power difference is a power difference between the reference signal receiving power for the second external antenna and the reference signal receiving power for the first internal antenna. The fourth power difference is a power difference between the reference signal receiving power for the second external antenna and the reference signal receiving power for the second internal antenna.

The power-difference threshold maybe 10 db, 20 db, 30 db, or the like, which is not limited herein.

As an example, at a time point a time period counted by a timer reaches the preset time period (e.g., 30 min), if a reference signal receiving power of each of the four antennas in the target antenna group is as follows, for example, the reference signal receiving power for the first external antenna is 50 db, the reference signal receiving power for the second external antenna is 40 db, the reference signal receiving power for the first internal antenna is 20 db, and the reference signal receiving power for the second internal antenna is 25 db are received, the antenna power-difference set is obtained by calculating antenna power differences, where the antenna power-difference set includes the first power difference which is 30 db, the second power difference which is 25 db, the third power difference which is 20 db, and the fourth power difference which is 15 db, and the preset power-difference threshold (e.g., 10 db) is also obtained. Then it can be determined that the first power difference, the second power difference, the third power difference, and the fourth power difference are all larger than the preset power-difference threshold, and thus the target antenna group is kept unchanged. At the time point the time period counted by the timer reaches the preset time period (e.g., 30 min), if the reference signal receiving power of each of the four antennas in the target antenna group is as follows, for example, the reference signal receiving power for the first external antenna is 10 db, the reference signal receiving power for the second external antenna is 40 db, the reference signal receiving power for the first internal antenna is 20 db, and the reference signal receiving power for the second internal antenna is 25 db are received, the antenna power-difference set is obtained by calculating antenna power differences, where the antenna power-difference set includes the first power difference which is −10 db, the second power difference which is −15 db, the third power difference which is 20 db, and the fourth power difference which is 15 db, and the preset power-difference threshold (e.g., 10 db) is also obtained. Then it can be determined that the first power difference and the second power is smaller than the preset power-difference threshold, and thus two internal antennas are selected from the four internal-antenna groups to replace the two external antennas. For example, if the first internal antenna is the internal antenna 6 and the second internal antenna is the internal antenna 8, two internal antennas (such as the internal antenna 10 and the internal antenna 3) are selected from the four internal-antenna groups, the two external antennas are disabled, and the internal antenna 10 and the internal antenna 3 are enabled.

Further, in terms of updating the target antenna group according to the four internal-antenna groups, the processor 603 is further configured to determine whether the two target internal antennas in the target antenna group are in a same internal-antenna group, and disable the two external antennas and enable two internal-antenna groups to which the two target internal antennas belong, in response to determining that the two target internal antennas of the target antenna group are not in a same internal-antenna group.

In some implementations, the two target internal antennas in the target antenna group are determined. Whether the two target internal antennas belong to a same internal-antenna group is determined. If the two target internal antennas belong to different internal-antenna groups, that is, the two target internal antennas correspond to two internal-antenna groups (if the two target internal antennas are the internal antenna 6 and the internal antenna 4, the two target internal antennas are in the internal-antenna group 1 and the internal-antenna group 3 respectively, that is, the two target internal antennas are in two different internal-antenna groups), the two external antennas is disabled, and two internal-antenna groups to which the two target internal antennas belong are enabled. Specifically, if the two internal antennas are the internal antenna 6 and the internal antenna 4, the internal-antenna group 1 and the internal-antenna group 3 are enabled.

In some implementations, the processor 430 is further configured to determine whether the two target internal antennas belong to a same internal-antenna group, disable the two external antennas and enable any two internal antennas in two internal-antenna groups adjacent to an internal-antenna group to which the two target internal antennas belong, in response to determining that the two target internal antennas belong to a same internal-antenna group, and receive a signal receiving quality value of the user terminal device. For each of the four internal-antenna groups, the processor 430 is further configured to repeat the above operation to obtain an antenna signal-quality set. The processor 430 is further configured to obtain a maximum value in the antenna signal-quality set, and form the target antenna group according to four internal antennas corresponding to the maximum value.

In some implementations, the two target internal antennas of the target antenna group are determined. Whether the two target internal antennas belong to a same internal-antenna group is determined. If the two target internal antennas belong to a same internal-antenna group, that is, the two target internal antennas are two internal antennas in one internal-antenna group (e.g., if the two target internal antennas are the internal antenna 6 and the internal antenna 10, the two target internal antennas belong to the internal-antenna group 1, that is, the two target internal antennas correspond to the internal-antenna group 1), the two external antennas are disabled, and two adjacent internal-antenna groups adjacent to an internal-antenna group to which the two target internal antennas belong are determined (specifically, if the two target internal antennas belong to the internal-antenna group 1, the internal-antenna group 2 and the internal-antenna group 3 are determined). One internal antenna is selected from each of the two adjacent internal-antenna groups (e.g., the internal antenna 3 and the internal antenna 4), a first internal-antenna scheme is formed by combining the selected internal antennas and the two target internal antennas, the first internal-antenna scheme is enabled, and a current signal receiving quality value of the user terminal equipment is received. The above operation is repeated to obtain multiple signal receiving quality values. Four internal antennas corresponding to a maximum value among the multiple signal receiving quality values are determined to form the target antenna group.

In one implementation, the current signal receiving quality value of the user terminal equipment is received as follows. A signal receiving quality operation is activated to obtain the signal receiving quality value. The signal receiving quality operation includes the following.

At 202*a*, according to a preset mapping relationship between channel quality indication (CQI) values and Sinr values, a CQI value $CQI_k$ of each Rank in a Sinr value is determined.

At 202*b*, according to a preset mapping relationship between CQI values and code rates, a code rate $R_k$ corresponding to the CQI value $CQI_k$ of each Rank is determined.

At 202*c*, a preset signal receiving quality calculation formula is obtained, and signal receiving quality efficiency of a current antenna group is calculated by taking the code rate $R_k$, a Rank value, and a modulation order m as inputs of a spectrum efficiency calculation formula, where the signal receiving quality calculation formula is:

$$\text{efficiency} = \Sigma_n{}^{Rank} m * R_k,$$

where Sinr (per Rank) represents a Sinr value per Rank (the larger a Sinr value, the higher a download rate), an RSRP value is a signal receiving power value, which is a key parameter that can represent the strength of a wireless signal, required by physical layer measurement in the long term evolution (LTE) network, and is an average value of signal receiving power values on all resource elements (RE) carrying reference signals in a certain symbol.

As can be seen, according to the implementations of the disclosure, the user terminal equipment can determine whether the user terminal equipment is coupled to the external-antenna group. When the user terminal equipment is coupled to the external-antenna group and the external-antenna group is determined to be enabled, two target internal antennas are determined from any of the four internal-antenna groups or two adjacent internal-antenna groups among the four internal-antenna groups. The target antenna group is formed according to the two target internal antennas and the two external antennas to receive and transmit radio frequency signals. When the terminal equipment is coupled to the external-antenna group, the two target internal antennas are determined from the internal-antenna groups to receive and transmit radio frequency signals. In this way, the terminal equipment can receive a relatively strong network signal, which is beneficial to enhancing signal stability and improving user experience.

Figure 10:
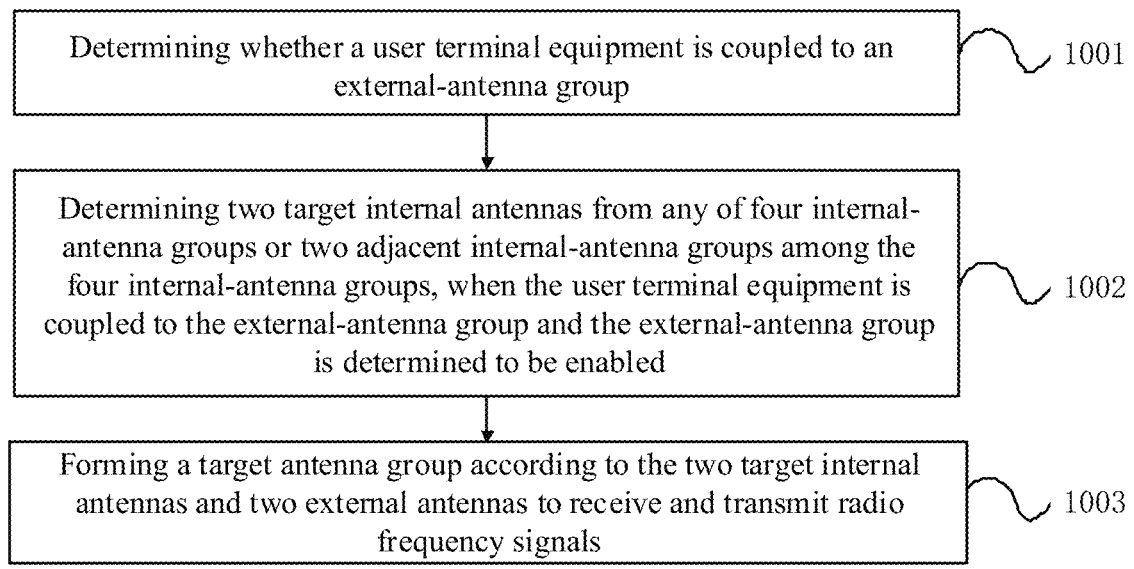
FIG. 10 is a schematic flowchart illustrating a method for antenna selection according to some implementations.

FIG. 10 is a schematic flowchart illustrating a method for antenna selection according to some implementations. The method is applicable to the user terminal equipment described in conjunction with FIG. 1 and the foregoing user terminal equipment. The user terminal equipment may include four internal-antenna groups and one external-antenna group. The four internal-antenna groups are distributed around a periphery of the user terminal equipment. Each internal-antenna group includes two internal antennas with different polarization directions. The external-antenna group is electrically coupled to the user terminal equipment via a peripheral interface of the user terminal equipment. As illustrated in FIG. 10, the method for antenna selection includes the following.

At 1001, whether the user terminal equipment is coupled to the external-antenna group is determined.

At 1002, when the user terminal equipment is coupled to the external-antenna group and the external-antenna group is determined to be enabled, two target internal antennas are determined from any of the four internal-antenna groups or two adjacent internal-antenna groups among the four internal-antenna groups.

At 1003, according to the two target internal antennas and two external antennas (of the external-antenna group), a target antenna group is formed to receive and transmit radio frequency signals.

As can be seen, according to the implementations of the disclosure, the user terminal equipment can determine whether the user terminal equipment is coupled to the external-antenna group. When the user terminal equipment is coupled to the external-antenna group and the external-antenna group is determined to be enabled, two target internal antennas are determined from any of the four internal-antenna groups or two adjacent internal-antenna groups among the four internal-antenna groups. The target antenna group is formed according to the two target internal antennas and the two external antennas to receive and transmit radio frequency signals. When the terminal equipment is coupled to the external-antenna group, the two target internal antennas are determined from the internal-antenna groups to receive and transmit radio frequency signals. In this way, the terminal equipment can receive a relatively strong network signal, which is beneficial to enhancing signal stability and improving user experience.

Figure 11:
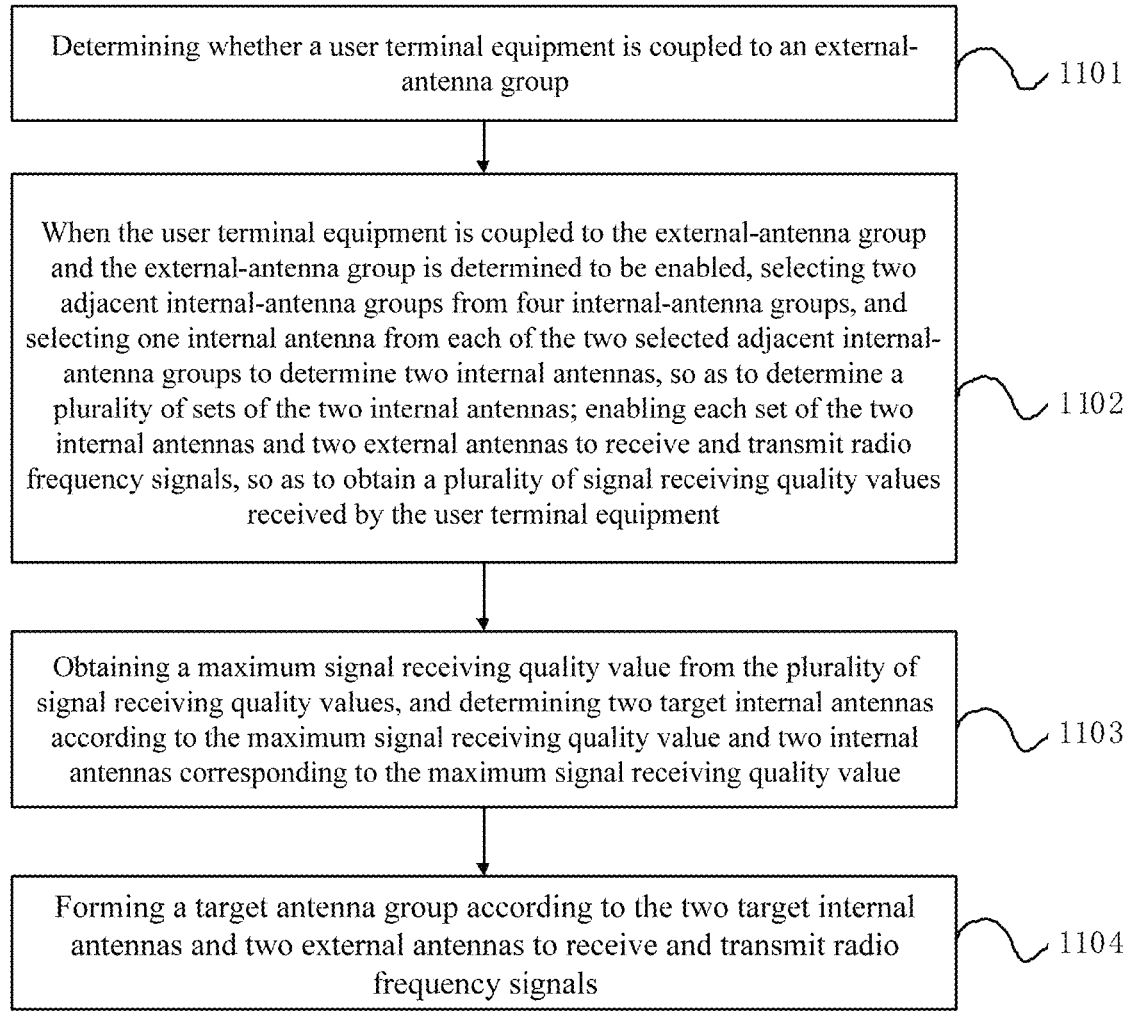
FIG. 11 is a schematic flowchart illustrating a method for antenna selection according to other implementations.

FIG. 11 is a schematic flowchart illustrating a method for antenna selection according to other implementations. The method is applicable to the foregoing user terminal equipment. The user terminal equipment may include four internal-antenna groups and one external-antenna group. The four internal-antenna groups are distributed around a periphery of the user terminal equipment. Each internal-antenna group includes two internal antennas with different polarization directions. The external-antenna group is electrically coupled to the user terminal equipment via a peripheral interface of the user terminal equipment. As illustrated in FIG. 11, the method for antenna selection includes the following.

At 1101, whether the user terminal equipment is coupled to the external-antenna group is determined.

At 1102, when the user terminal equipment is coupled to the external-antenna group and the external-antenna group is determined to be enabled, two adjacent internal-antenna groups are selected from the four internal-antenna groups, and one internal antenna is selected from each of the two selected adjacent internal-antenna groups to determine two internal antennas, so as to determine multiple sets of the two internal antennas; each set of the two internal antennas (among the multiple sets of the two internal antennas) and two external antennas are enabled to receive and transmit radio frequency signals, so as to obtain multiple signal receiving quality values received by the user terminal equipment.

At 1103, a maximum signal receiving quality value is obtained from the multiple signal receiving quality values, and two target internal antennas are determined according to the maximum signal receiving quality value and two internal antennas corresponding to the maximum signal receiving quality value.

At 1104, a target antenna group is formed according to the two target internal antennas and the two external antennas to receive and transmit radio frequency signals.

For details of operations at 1101 to 1104, reference may be made to the related descriptions in the foregoing method for antenna selection described in FIG. 10, and it will not be described in further detail herein.

As can be seen, according to the implementations of the disclosure, the user terminal equipment can determine whether the user terminal equipment is coupled to the external-antenna group. When the user terminal equipment is coupled to the external-antenna group and the external-antenna group is determined to be enabled, two adjacent internal-antenna groups are selected from the four internal-antenna groups, and one internal antenna is selected from each of the two selected adjacent internal-antenna groups to determine two internal antennas, so as to determine multiple sets of the two internal antennas. Each set of the two internal antennas and the two internal antennas are enabled to receive and transmit radio frequency signals, so as to obtain multiple signal receiving quality values received by the user terminal equipment. A maximum signal receiving quality value is obtained from the multiple signal receiving quality values. Two target internal antennas are determined according to the maximum signal receiving quality value and two internal antennas corresponding to the maximum signal receiving quality value. A target antenna group is formed according to the two target internal antennas and the two external antennas to receive and transmit radio frequency signals. When the terminal equipment is coupled to the external-antenna group, the two external antennas and target internal antennas respectively determined from two adjacent internal-antenna groups are configured to receive and transmit radio frequency signals. In this way, the terminal equipment can receive a relatively strong network signal, which is beneficial to enhancing signal stability and improving user experience.

Figure 12:
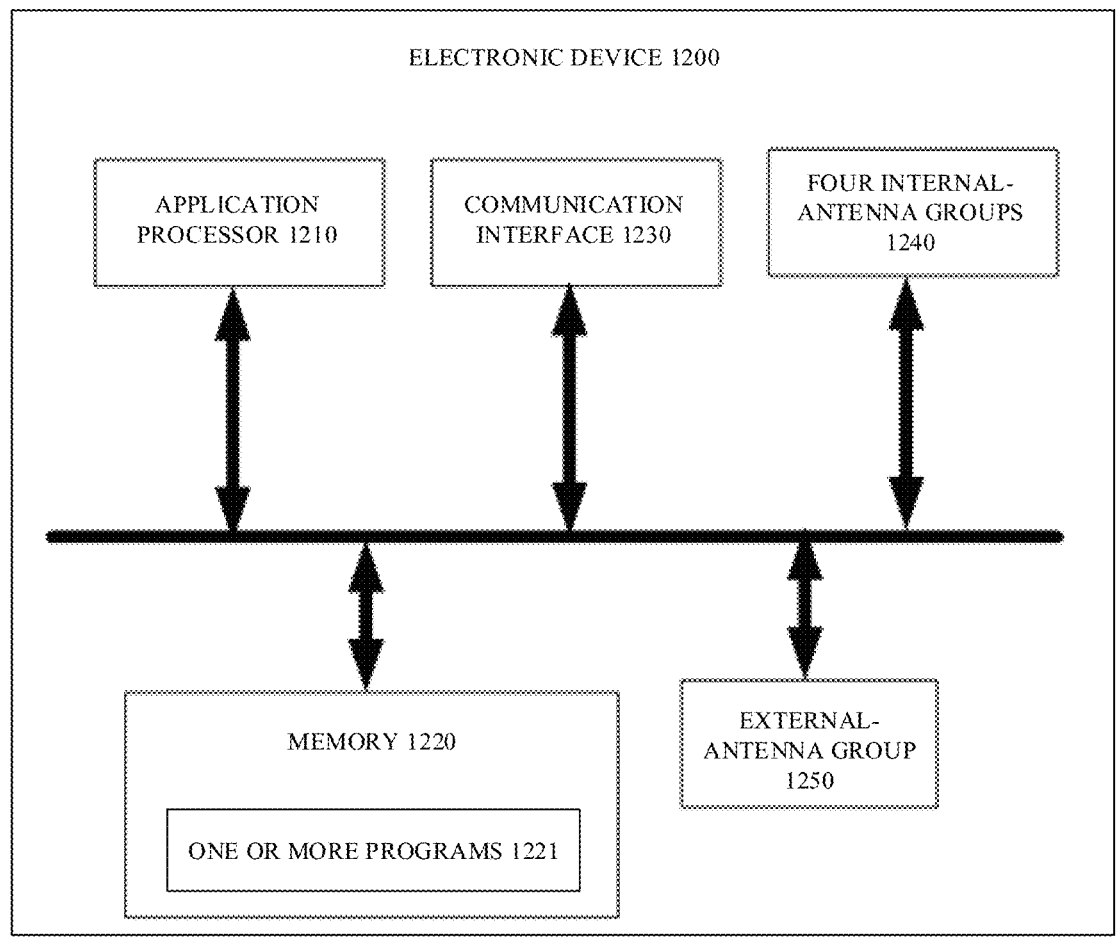
FIG. 12 is a schematic structural diagram illustrating an electronic device according to some implementations.

Similar to the foregoing implementations, FIG. 12 is a schematic structural diagram illustrating an electronic device 1200 according to some implementations. As illustrated in FIG. 12, the electronic device 1200 includes an application processor 1210, a memory 1220, a communication interface 1230, four internal-antenna groups 1240, one external-antenna group 1250, and one or more programs 1221. The one or more programs 1221 are stored in the memory 1220 and configured to be executed by the application processor 1210. The one or more programs 1221 include instructions which, when executed, cause the processor to execute the following. Whether the electronic device is coupled to the external-antenna group is determined. When the electronic device is coupled to the external-antenna group and the external-antenna group is determined to be enabled, two target internal antennas are determined from any of the four internal-antenna groups or two adjacent internal-antenna groups among the four internal-antenna groups. A target antenna group is formed according to the two target internal antennas and two external antennas to receive and transmit radio frequency signals.

As can be seen, according to the implementations of the disclosure, the electronic device can determine whether the electronic device is coupled to the external-antenna group. When the electronic device is coupled to the external-antenna group and the external-antenna group is determined to be enabled, two target internal antennas are determined from any of the four internal-antenna groups or two adjacent internal-antenna groups among the four internal-antenna groups. The target antenna group is formed according to the two target internal antennas and the two external antennas to receive and transmit radio frequency signals. When the electronic device is coupled to the external-antenna group, the two target internal antennas are determined from the internal-antenna groups to receive and transmit radio frequency signals. In this way, the electronic device can receive a relatively strong network signal, which is beneficial to enhancing signal stability and improving user experience.

In some implementations, in terms of determining the two target internal antennas from any of the four internal-antenna groups or two adjacent internal-antenna groups among the four internal-antenna groups, the instructions in the programs are executed by the processor to carry out following actions. Two adjacent internal-antenna groups are selected from the four internal-antenna groups. One internal antenna is selected from each of the two selected adjacent internal-antenna groups to determine two internal antennas, so as to determine multiple sets of the two internal antennas. Each set of the two internal antennas and the two external antennas are enabled to receive and transmit radio frequency signals, so as to obtain multiple signal receiving quality values received by the electronic device. A maximum signal receiving quality value is obtained from the multiple signal receiving quality values. The two target internal antennas are determined according to the maximum signal receiving quality value and two internal antennas corresponding to the maximum signal receiving quality value.

In some implementations, in terms of determining the two target internal antennas according to the maximum signal receiving quality value and the two internal antennas corresponding to the maximum signal receiving quality value, the instructions in the programs are executed by the processor to carry out following actions. Two internal-antenna groups to which the two internal antennas corresponding to the maximum signal receiving quality value belong are determined. For the two internal-antenna groups determined, obtain two signal receiving quality values corresponding to the two internal-antenna groups by performing the following: for each of the two internal-antenna groups determined, enable two internal antennas of the internal-antenna group and the two external antennas, so as to obtain the two signal receiving quality values of the electronic device. A maximum value of the maximum signal receiving quality value and the two signal receiving quality values is obtained. When the maximum value is the maximum signal receiving quality value, the two internal antennas corresponding to the maximum signal receiving quality value are determined as the two target internal antennas. When the maximum value is any one of the two signal receiving quality values, two internal antennas in an internal-antenna group corresponding to the maximum value are determined as the two target internal antennas.

In some implementations, in terms of determining the two target internal antennas from any of the four internal-antenna groups or two adjacent internal-antenna groups among the four internal-antenna groups, the instructions in the programs are executed by the processor to carry out following actions. Any one internal-antenna group is selected from the four internal-antenna groups. Two internal antennas belonging to the internal-antenna group is determined, so as to determine four sets of the two internal antennas. Each set of the two internal antennas and the two external antennas is enabled to receive and transmit radio frequency signals, so as to obtain four signal receiving quality values received by the electronic device. A maximum signal receiving quality value is obtained from the four signal receiving quality values. The two target internal antennas are determined according to the maximum signal receiving quality value and two internal antennas corresponding to the maximum signal receiving quality value.

In some implementations, after obtaining the maximum signal receiving quality value, the instructions in the programs are executed by the processor to carry out following actions. A historical optimal antenna group is obtained, where the historical optimal antenna group includes the two external antennas and two historical optimal internal antennas. Whether the two historical optimal internal antennas are identical to the two internal antennas corresponding to the maximum signal receiving quality value is determined. In response to determining that the two historical optimal internal antennas are identical to the two internal antennas corresponding to the maximum signal receiving quality value, the two internal antennas corresponding to the maximum signal receiving quality value are determined as the two target internal antennas. In response to determining that the two historical optimal internal antennas are different from the two internal antennas corresponding to the maximum signal receiving quality value, proceed to the determining of the two target internal antennas according to the maximum signal receiving quality value and the two internal antennas corresponding to the maximum signal receiving quality value.

In some implementations, after forming the target antenna group according to the two target internal antennas and the two external antennas, the instructions in the programs are further executed by the processor to carry out following actions. Search for and access a connectable network access point in a current environment based on the target antenna group. In a preset time period, a reference signal receiving power for a first external antenna of the target antenna group, a reference signal receiving power for a second external antenna of the target antenna group, a reference signal receiving power for a first internal antenna of the target antenna group, and a reference signal receiving power for a second internal antenna of the target antenna group are obtained. Power differences for the reference signal receiving power for the first internal antenna, the reference signal receiving power for the second internal antenna, the reference signal receiving power for the first external antenna, and the reference signal receiving power for the second external antenna are calculated, to obtain an antenna power-difference set, where the antenna power-difference set includes: a first power difference, a second power difference, a third power difference, and a fourth power difference. When the antenna power-difference set includes at least one power difference smaller than or equal to a preset power-difference threshold, the target antenna group is updated according to the four internal-antenna groups.

In some implementations, in terms of updating the target antenna group according to the four internal-antenna groups, the instructions in the programs are executed by the processor to carry out following actions. Whether the two target internal antennas of the target antenna group belong to a same internal-antenna group is determined. In response to determining that the two target internal antennas of the target antenna group do not belong to a same internal-antenna group, the two external antennas are disabled and two internal-antenna groups to which the two target internal antennas belong are enabled.

In some implementations, the instructions in the programs are further executed by the processor to carry out following actions. In response to determining that the two target internal antennas belong to a same internal-antenna group: disable the two external antennas, and enable any two internal antennas of two internal-antenna groups adjacent to an internal-antenna group to which the two target internal antennas belong; for each of four internal-antenna groups including the enabled two internal antennas and the two target internal antennas, receive a signal receiving quality value of the electronic device, to obtain an antenna signal-quality set; and obtain a maximum value in the antenna signal-quality set, and form the target antenna group according to four internal antennas corresponding to the maximum value.

The foregoing solution of the implementations of the disclosure is mainly described from the viewpoint of execution process of the method. It can be understood that, in order to implement the above functions, the electronic device includes hardware structures and/or software modules corresponding to the respective functions. Those skilled in the art should readily recognize that, in combination with the example units and scheme steps described in the implementations disclosed herein, the disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the disclosure.

According to the implementations of the disclosure, functional units may be divided for the user equipment in accordance with the foregoing method examples. For example, each functional unit may be divided according to each function, and two or more functions may be integrated in one control unit. The above-mentioned integrated unit can be implemented in the form of hardware or software functional units. It should be noted that the division of units in the implementations of the disclosure is schematic, and is merely a logical function division, and there may be other division manners in actual implementation.

Implementations of the disclosure further provide a computer storage medium. The computer storage medium stores computer programs for electronic data interchange. When executed, the computer programs cause a computer to execute all or part of the operations of the method described in the foregoing method implementations. The computer includes an electronic device.

Implementations of the disclosure further provide a computer program product. The computer program product includes a non-transitory computer readable storage medium configured to store computer programs. The computer programs are operable with a computer to execute all or part of the operations of the method described in the foregoing method implementations. The computer program product may be a software installation package. The computer includes an electronic device.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device/equipment implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection via some interfaces, or may be indirect coupling or communication among devices or units, and may be electrical connection, or other forms of connection.

The units described as separate components may or may not be physically separate, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various implementations of the disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or part of the operations of the method of the various implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A user terminal equipment, comprising:
   a radio frequency front-end module configured to control antennas to receive and transmit radio frequency signals;
   an antenna module configured to receive and transmit radio frequency signals and comprising N internal antennas and M external antennas, the M external antennas being electrically coupled to the radio frequency front-end module via a peripheral interface of the user terminal equipment, N being an integer larger than 0, and M being a positive integer smaller than or equal to N; and
   a processor configured to select M internal antennas from the N internal antennas to receive and transmit radio frequency signals when the M external antennas are configured to receive and transmit radio frequency signals, to realize reception and transmission of radio frequency signals from 2M*2M channels.

2. The user terminal equipment of claim 1, wherein the N internal antennas are divided into N/2 internal-antenna groups, wherein each internal-antenna group comprises a first antenna in a first polarization direction and a second antenna in a second polarization direction, and the N/2 internal-antenna groups are respectively distributed on N/2 different planes along a periphery of the user terminal equipment, wherein N is an even number larger than or equal to 2.

3. The user terminal equipment of claim 2, wherein:
   the N internal antennas comprise eight internal antennas, wherein the eight internal antennas are divided into four internal-antenna groups, wherein the four internal-antenna groups are distributed around the periphery of the user terminal equipment, and each of the four internal-antenna groups comprises the first antenna in the first polarization direction and the second antenna in the second polarization direction; and
   the M external antennas comprise two external antennas, wherein the two external antennas form an external-antenna group.

4. The user terminal equipment of claim 3, wherein the processor is configured to select two target internal antennas from the eight internal antennas to receive and transmit radio frequency signals when the two external antennas are configured to receive and transmit radio frequency signals.

5. The user terminal equipment of claim 4, wherein:
   the processor is configured to determine whether the user terminal equipment is coupled to the external-antenna group when the two external antennas are configured to receive and transmit radio frequency signals, and select the two target internal antennas from any of the four internal-antenna groups or two adjacent internal-antenna groups among the four internal-antenna groups when the user terminal equipment is coupled to the external-antenna group and the external-antenna group is determined to be enabled; and
   the radio frequency front-end module is configured to control the two target internal antennas and the two external antennas to receive and transmit radio frequency signals.

6. The user terminal equipment of claim 5, wherein:
   when the two target internal antennas are determined from two adjacent internal-antenna groups among the four internal-antenna groups,
   the processor is configured to select two adjacent internal-antenna groups from the four internal-antenna groups, and select one internal antenna from each of the two selected adjacent internal-antenna groups to determine the two target internal antennas, so as to determine a plurality of sets of the two target internal antennas.

7. The user terminal equipment of claim 6, wherein:
   the radio frequency front-end module is configured to enable each set of the two target internal antennas and the two external antennas to receive and transmit radio frequency signals, and receive a signal receiving quality value of the user terminal equipment, so as to obtain a plurality of signal receiving quality values; and
   the processor is configured to obtain a maximum signal receiving quality value from the plurality of signal receiving quality values, and control the radio frequency front-end module to enable a set of the two target internal antennas corresponding to the maximum signal receiving quality value and the two external antennas to receive and transmit radio frequency signals.

8. The user terminal equipment of claim 4, wherein:
the processor is configured to determine whether the user terminal equipment is coupled to the external-antenna group when the two external antennas are configured to receive and transmit radio frequency signals, and select two internal antennas of a same internal-antenna group among the four internal-antenna groups as the two target internal antennas when the user terminal equipment is coupled to the external-antenna group and the external-antenna group is determined to be enabled, so as to determine a plurality of sets of the two target internal antennas.

9. The user terminal equipment of claim 8, wherein:
the radio frequency front-end module is configured to enable each set of the two target internal antennas and the two external antennas to receive and transmit radio frequency signals, and receive a signal receiving quality value of the user terminal equipment, so as to obtain a plurality of signal receiving quality values; and
the processor is configured to obtain a maximum signal receiving quality value from the plurality of signal receiving quality values, and control the radio frequency front-end module to enable a set of the two target internal antennas corresponding to the maximum signal receiving quality value and the two external antennas to receive and transmit radio frequency signals.

10. A method for antenna selection, applicable to a user terminal equipment comprising four internal-antenna groups and one external-antenna group, the four internal-antenna groups being distributed around a periphery of the user terminal equipment, each internal-antenna group comprising two internal antennas with different polarization directions, and the external-antenna group comprising two external antennas and being electrically coupled to the user terminal equipment via a peripheral interface of the user terminal equipment, the method comprising:
determining whether the user terminal equipment is coupled to the external-antenna group;
determining two target internal antennas from any of the four internal-antenna groups or two adjacent internal-antenna groups among the four internal-antenna groups, when the user terminal equipment is coupled to the external-antenna group and the external-antenna group is determined to be enabled; and
forming a target antenna group according to the two target internal antennas and the two external antennas to receive and transmit radio frequency signals.

11. The method of claim 10, wherein determining the two target internal antennas from any of the four internal-antenna groups or two adjacent internal-antenna groups among the four internal-antenna groups comprises:
selecting two adjacent internal-antenna groups from the four internal-antenna groups, and selecting one internal antenna from each of the two selected adjacent internal-antenna groups to determine two internal antennas, so as to determine a plurality of sets of the two internal antennas;
enabling each set of the two internal antennas and the two external antennas to receive and transmit radio frequency signals, so as to obtain a plurality of signal receiving quality values received by the user terminal equipment; and
obtaining a maximum signal receiving quality value from the plurality of signal receiving quality values, and determining the two target internal antennas according to the maximum signal receiving quality value and two internal antennas corresponding to the maximum signal receiving quality value.

12. The method of claim 11, wherein determining the two target internal antennas according to the maximum signal receiving quality value and the two internal antennas corresponding to the maximum signal receiving quality value comprises:
determining two internal-antenna groups to which the two internal antennas corresponding to the maximum signal receiving quality value belong; and
for the two internal-antenna groups determined, obtaining two signal receiving quality values corresponding to the two internal-antenna groups by performing the following:
for each of the two internal-antenna groups determined, enabling two internal antennas of the internal-antenna group and the two external antennas, so as to obtain the two signal receiving quality values of the user terminal equipment;
obtaining a maximum value of the maximum signal receiving quality value and the two signal receiving quality values obtained; and
determining the two internal antennas corresponding to the maximum signal receiving quality value as the two target internal antennas when the maximum value is the maximum signal receiving quality value, and determining two internal antennas in an internal-antenna group corresponding to the maximum value as the two target internal antennas when the maximum value is any one of the two signal receiving quality values.

13. The method of claim 11, further comprising:
after obtaining the maximum signal receiving quality value,
obtaining a historical optimal antenna group, wherein the historical optimal antenna group comprises the two external antennas and two historical optimal internal antennas;
determining whether the two historical optimal internal antennas are identical to the two internal antennas corresponding to the maximum signal receiving quality value;
determining the two internal antennas corresponding to the maximum signal receiving quality value as the two target internal antennas, in response to determining that the two historical optimal internal antennas are identical to the two internal antennas corresponding to the maximum signal receiving quality value; and
proceeding to the determining of the two target internal antennas according to the maximum signal receiving quality value and the two internal antennas corresponding to the maximum signal receiving quality value, in response to determining that the two historical optimal internal antennas are different from the two internal antennas corresponding to the maximum signal receiving quality value.

14. The method of claim 10, wherein determining the two target internal antennas from any of the four internal-antenna groups or two adjacent internal-antenna groups among the four internal-antenna groups comprises:
selecting any one internal-antenna group from the four internal-antenna groups and determining two internal antennas from the internal-antenna group selected, so as to determine four sets of the two internal antennas;
enabling each set of the two internal antennas and the two external antennas to receive and transmit radio frequency signals, so as to obtain four signal receiving quality values received by the user terminal equipment; and obtaining a maximum signal receiving quality value from the four signal receiving quality values, and determining the two target internal antennas according to the maximum signal receiving quality value and two internal antennas corresponding to the maximum signal receiving quality value.

15. The method of claim 10, further comprising:

after forming the target antenna group according to the two target internal antennas and the two external antennas, searching for and accessing a connectable network access point in a current environment based on the target antenna group;

in a preset time period, obtaining a reference signal receiving power for a first external antenna of the target antenna group, a reference signal receiving power for a second external antenna of the target antenna group, a reference signal receiving power for a first internal antenna of the target antenna group, and a reference signal receiving power for a second internal antenna of the target antenna group;

calculating power differences for the reference signal receiving power for the first internal antenna, the reference signal receiving power for the second internal antenna, the reference signal receiving power for the first external antenna, and the reference signal receiving power for the second external antenna, to obtain an antenna power-difference set, wherein the antenna power-difference set comprises: a first power difference, a second power difference, a third power difference, and a fourth power difference; and updating the target antenna group according to the four internal-antenna groups, when the antenna power-difference set comprises at least one power difference smaller than or equal to a preset power-difference threshold.

16. The method of claim 15, wherein updating the target antenna group according to the four internal-antenna groups comprises:

determining whether the two target internal antennas of the target antenna group belong to a same internal-antenna group; and disabling the two external antennas and enabling two internal-antenna groups to which the two target internal antennas belong, in response to determining that the two target internal antennas of the target antenna group do not belong to a same internal-antenna group.

17. The method of claim 16, further comprising:

in response to determining that the two target internal antennas belong to a same internal-antenna group, disabling the two external antennas, and enabling any two internal antennas of two internal-antenna groups adjacent to an internal-antenna group to which the two target internal antennas belong;

for each of four internal-antenna groups comprising the enabled two internal antennas and the two target internal antennas, receiving a signal receiving quality value of the user terminal equipment, to obtain an antenna signal-quality set; and obtaining a maximum value in the antenna signal-quality set, and forming the target antenna group according to four internal antennas corresponding to the maximum value.

18. The method of claim 15, wherein:

the first power difference is a power difference between the reference signal receiving power for the first external antenna and the reference signal receiving power for the first internal antenna;

the second power difference is a power difference between the reference signal receiving power for the first external antenna and the reference signal receiving power for the second internal antenna;

the third power difference is a power difference between the reference signal receiving power for the second external antenna and the reference signal receiving power for the first internal antenna; and the fourth power difference is a power difference between the reference signal receiving power for the second external antenna and the reference signal receiving power for the second internal antenna.

19. An electronic device, comprising:

four internal-antenna groups;

one external-antenna group;

at least one processor; and a non-transitory computer readable storage coupled to the at least one processor and storing at least one computer executable instruction thereon which, when executed by the at least one processor, causes the at least one processor to:

determine whether the electronic device is coupled to the external-antenna group, the four internal-antenna groups being distributed around a periphery of the electronic device, each internal-antenna group comprising two internal antennas with different polarization directions, and the external-antenna group comprising two external antennas and being electrically coupled to the electronic device via a peripheral interface of the electronic device;

determine two target internal antennas from any of the four internal-antenna groups or two adjacent internal-antenna groups among the four internal-antenna groups, when the electronic device is coupled to the external-antenna group and the external-antenna group is determined to be enabled; and form a target antenna group according to the two target internal antennas and the two external antennas to receive and transmit radio frequency signals.

20. The electronic device of claim 19, wherein the at least one processor configured to determine the two target internal antennas from any of the four internal-antenna groups or two adjacent internal-antenna groups among the four internal-antenna groups is configured to:

select two adjacent internal-antenna groups from the four internal-antenna groups, and select one internal antenna from each of the two selected adjacent internal-antenna groups to determine two internal antennas, so as to determine a plurality of sets of the two internal antennas;

enable each set of the two internal antennas and the two external antennas to receive and transmit radio frequency signals, so as to obtain a plurality of signal receiving quality values received by the electronic device; and obtain a maximum signal receiving quality value from the plurality of signal receiving quality values, and determine the two target internal antennas according to the maximum signal receiving quality value and two internal antennas corresponding to the maximum signal receiving quality value.

* * * * *